(12) United States Patent
Radhakrishnan

(10) Patent No.: US 9,639,630 B1
(45) Date of Patent: May 2, 2017

(54) SYSTEM FOR BUSINESS INTELLIGENCE DATA INTEGRATION

(71) Applicant: Guidanz Inc., Fremont, CA (US)

(72) Inventor: Shankar Radhakrishnan, Fremont, CA (US)

(73) Assignee: GUIDANZ INC., Fremont, CA (US)

( * ) Notice: Subject to any disclaimer, the term of this patent is extended or adjusted under 35 U.S.C. 154(b) by 0 days.

(21) Appl. No.: 15/143,444

(22) Filed: Apr. 29, 2016

Related U.S. Application Data

(60) Provisional application No. 62/297,122, filed on Feb. 18, 2016.

(51) Int. Cl.
*G06F 17/30* (2006.01)

(52) U.S. Cl.
CPC .... *G06F 17/3092* (2013.01); *G06F 17/30938* (2013.01)

(58) Field of Classification Search
CPC .............. G06F 17/3092; G06F 17/30938
See application file for complete search history.

(56) References Cited

U.S. PATENT DOCUMENTS

| | | | |
|---|---|---|---|
| 7,805,435 B2 | 9/2010 | Dettinger et al. | |
| 8,375,041 B2 | 2/2013 | Webster et al. | |
| 9,418,085 B1* | 8/2016 | Shih | G06F 17/30292 |
| 2002/0161778 A1* | 10/2002 | Linstedt | G06Q 10/06 |
| 2004/0230571 A1* | 11/2004 | Robertson | G06F 17/30312 |
| 2005/0278368 A1* | 12/2005 | Benedikt | G06F 17/30914 |
| 2008/0120129 A1* | 5/2008 | Seubert | G06Q 10/06 705/35 |
| 2009/0006318 A1 | 1/2009 | Lehtipalo et al. | |
| 2009/0319544 A1* | 12/2009 | Griffin | G06F 17/30557 |
| 2011/0128378 A1* | 6/2011 | Raji | G06F 17/30873 348/143 |
| 2013/0110775 A1* | 5/2013 | Forsythe | G06F 17/30943 707/613 |
| 2013/0227573 A1* | 8/2013 | Morsi | G06F 9/5083 718/100 |
| 2014/0040182 A1* | 2/2014 | Gilder | G06F 17/30578 707/602 |
| 2014/0074771 A1* | 3/2014 | He | G06F 17/30592 707/602 |
| 2014/0214897 A1* | 7/2014 | Zhu | G06F 17/30477 707/771 |
| 2014/0244719 A1* | 8/2014 | Clark | H04W 4/206 709/203 |
| 2015/0019488 A1* | 1/2015 | Higginson | G06F 17/303 707/634 |

(Continued)

*Primary Examiner* — Noosha Arjomandi
(74) *Attorney, Agent, or Firm* — Galvin Patent Law LLC; Brian R. Galvin

(57) ABSTRACT

A system for business intelligence data integration, comprising a query transformation server that receives an SQL query, applies transformations to the query, and embeds the transformed query into an XML web services request. At least a portion of the XML web services request is sent to a business intelligence engine web service. An XML response is received from the business intelligence engine web service. The system applies modifications to the XML response including extracting SQL from the XML and adding back the visualization-specific column to generate a complete SQL response, which is provided to the client device.

11 Claims, 7 Drawing Sheets

(56) References Cited

U.S. PATENT DOCUMENTS

| | | | |
|---|---|---|---|
| 2015/0370228 A1* | 12/2015 | Kohn | G05B 13/04 700/31 |
| 2016/0210202 A1* | 7/2016 | Sinha | G06F 11/1469 |
| 2016/0253339 A1* | 9/2016 | Ambrose | G06F 3/0608 707/693 |
| 2016/0342661 A1* | 11/2016 | Kumarasamy | G06F 17/30474 |
| 2016/0378614 A1* | 12/2016 | Thanasekaran | G06F 11/1464 707/652 |

* cited by examiner

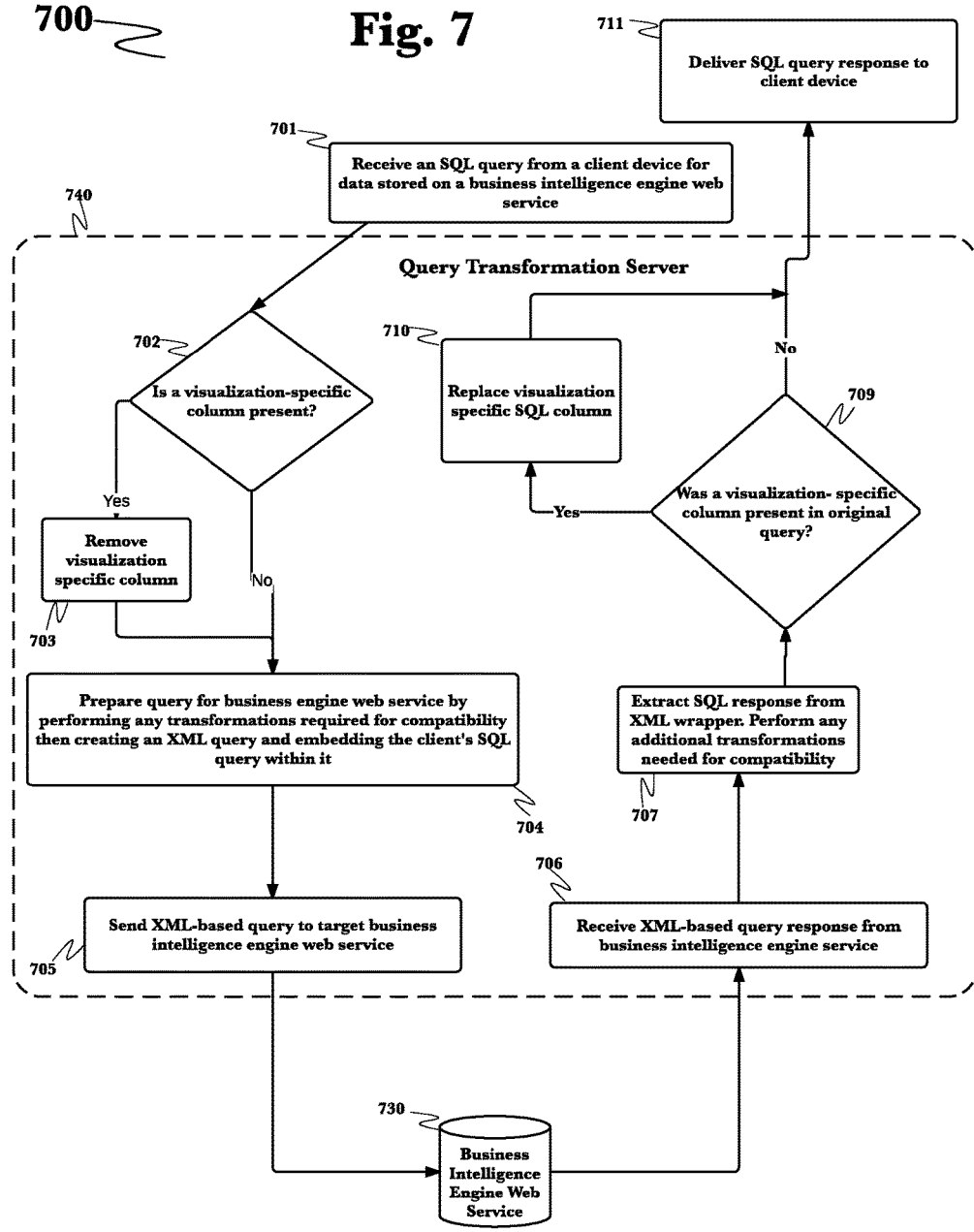

SYSTEM FOR BUSINESS INTELLIGENCE DATA INTEGRATION

CROSS-REFERENCE TO RELATED APPLICATIONS

This application claims the benefit of, and priority to, U.S. provisional patent application Ser. No. 62/297,122, titled "SYSTEM FOR BUSINESS INTELLIGENCE DATA INTEGRATION" filed on Feb. 18, 2016, the entire specification of which is incorporated herein by reference in its entirety.

BACKGROUND OF THE INVENTION

Field of the Art

The disclosure relates to the field of business analytics, and more particularly to the field of integrating business intelligence data sources with visualization platforms.

Discussion of the State of the Art

In business analysis, corporations often have considerable investments in their business intelligence (BI) systems such as Oracle OBIEE™, COGNOS™, MICROSTRATEGY™, BUSINESS OBJECTS™, and others. For interacting with collected BI data, various visualization systems may be used such as TABLEAU™, Microsoft POWERBI™, QLIKVIEW™, SPOTFIRE™, Microsoft EXCEL™, and others. However, the process of transferring data into these systems for use is laborious and risky. There may be risk of data duplication, issues with consistency, as well as information security concerns.

What is needed, is a system that integrates directly with BI data sources and visualization systems to natively migrate information and present it using familiar visualization platforms, that automates migration and visualization processes while protecting the data against corruption, duplication, or security leaks.

SUMMARY OF THE INVENTION

Accordingly, the inventor has conceived and reduced to practice, in a preferred embodiment of the invention, a system for business intelligence data integration that connects to a data source and uses the source's native data model and security rules, and that integrates with a visualization platform and uses the platform's native visualizations to build data presentations, and that may also integrate with external data sources or systems and incorporate data from external sources alongside data from BI data sources within visualizations.

According to a preferred embodiment of the invention, a system for business intelligence data integration, comprising a query transformation server comprising at least a plurality of programming instructions stored in a memory and operating on a processor of a network-connected computing device and configured to connect to a plurality of business intelligence engine web services via a network, receive a SQL query from a client device, apply a plurality of transformations to the SQL query including at least removal of a visualization-specific column from the SQL query and embedding the SQL query into an XML web services request, provide at least a portion of the XML web services request to a business intelligence engine web service, receive an XML response from the business intelligence engine web service, apply a plurality of modifications to at least a portion of the XML response including extracting SQL from the XML and adding back the visualization-specific column to generate a complete SQL response, and provide the SQL response to the client device; and a plurality of communication adapters configured to facilitate bi-directional communication between query transformation server and other [business intelligence] systems via a network is disclosed.

According to a further preferred embodiment of the invention, a method for business intelligence data integration is disclosed, comprising the steps of: (a) receiving an SQL query from a client device at a query transformation server comprising at least a plurality of programming instructions stored in a memory and operating on a processor of a network-connected computing device and configured to connect to a plurality of business intelligence engine web services via a network; (b) applying a plurality of transformations to the SQL query including at least removal of a visualization-specific column from the SQL query; embedding the SQL query into an XML web services request using the query transformation server; (c) providing at least a portion of the XML web services request to a business intelligence engine web service; (d) receiving an XML response from the business intelligence engine web service to the query transformation server; (e) applying a plurality of modifications to at least a portion of the XML response including extracting SQL from the XML and reattaching the visualization-specific column to generate a complete SQL response using the query transformation server and providing the SQL response to the client device; (f) applying a plurality of transformations to at least a portion of the query; (g) transmitting at least a portion of the transformed query to a business intelligence engine web service; (h) receiving a response from the business intelligence engine; and (i) providing at least a portion of the response to the client device.

BRIEF DESCRIPTION OF THE DRAWING FIGURES

The accompanying drawings illustrate several embodiments of the invention and, together with the description, serve to explain the principles of the invention according to the embodiments. It will be appreciated by one skilled in the art that the particular embodiments illustrated in the drawings are merely exemplary, and are not to be considered as limiting of the scope of the invention or the claims herein in any way.

FIG. 7 is a flow diagram illustrating an exemplary method 700 for business intelligence integration, illustrating a process for query translation and processing, by a query transformation server according to a preferred embodiment of the invention

DETAILED DESCRIPTION

Figure 1:
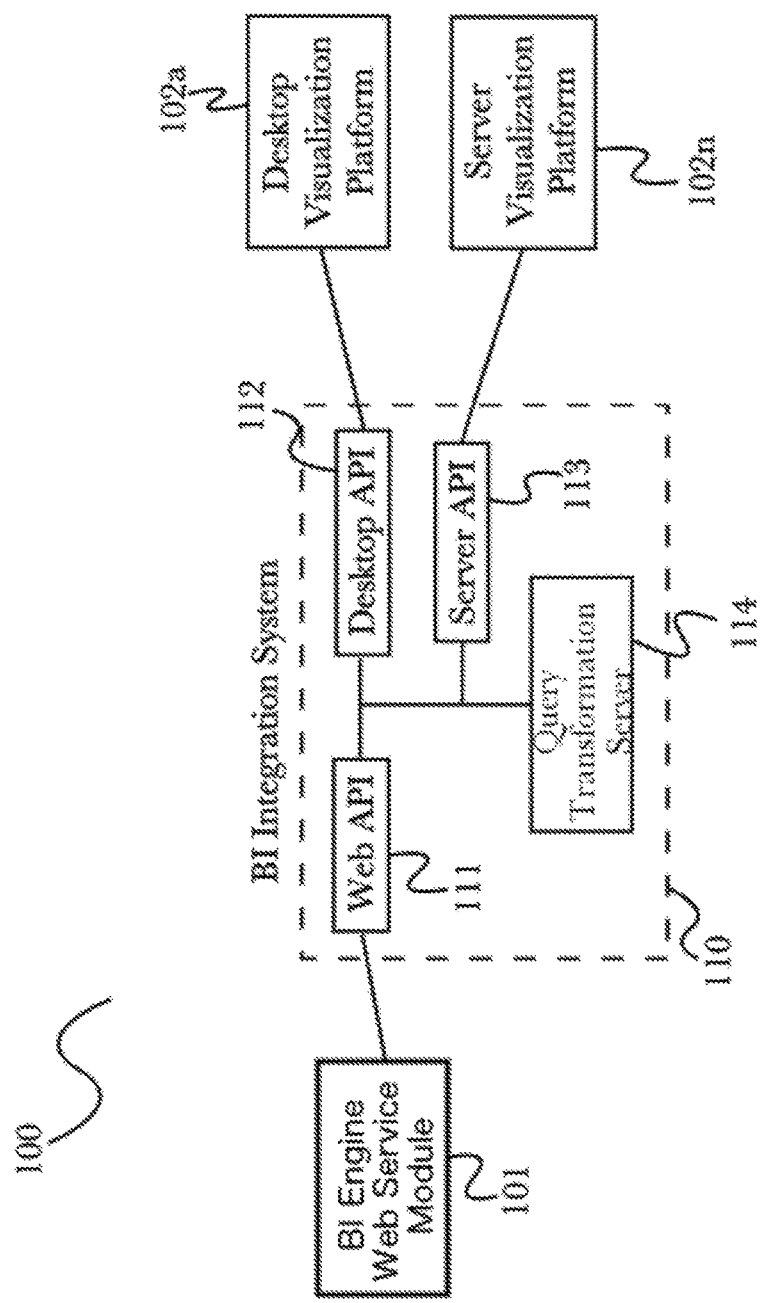
FIG. 1 is a block diagram illustrating an exemplary hardware architecture of a computing device used in an embodiment of the invention.

The inventor has conceived, and reduced to practice, in a preferred embodiment of the invention, a system for business intelligence data integration that connects to a data source and uses the source's native data model and security rules, and that integrates with a visualization platform and uses the platform's native visualizations to build data presentations, and that may also integrate with external data sources or systems and incorporate data from external sources alongside data from BI sources within visualizations.

One or more different inventions may be described in the present application. Further, for one or more of the inventions described herein, numerous alternative embodiments may be described; it should be appreciated that these are presented for illustrative purposes only and are not limiting of the inventions contained herein or the claims presented herein in any way. One or more of the inventions may be widely applicable to numerous embodiments, as may be readily apparent from the disclosure. In general, embodiments are described in sufficient detail to enable those skilled in the art to practice one or more of the inventions, and it should be appreciated that other embodiments may be utilized and that structural, logical, software, electrical and other changes may be made without departing from the scope of the particular inventions. Accordingly, one skilled in the art will recognize that one or more of the inventions may be practiced with various modifications and alterations. Particular features of one or more of the inventions described herein may be described with reference to one or more particular embodiments or figures that form a part of the present disclosure, and in which are shown, by way of illustration, specific embodiments of one or more of the inventions. It should be appreciated, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Figure 3:
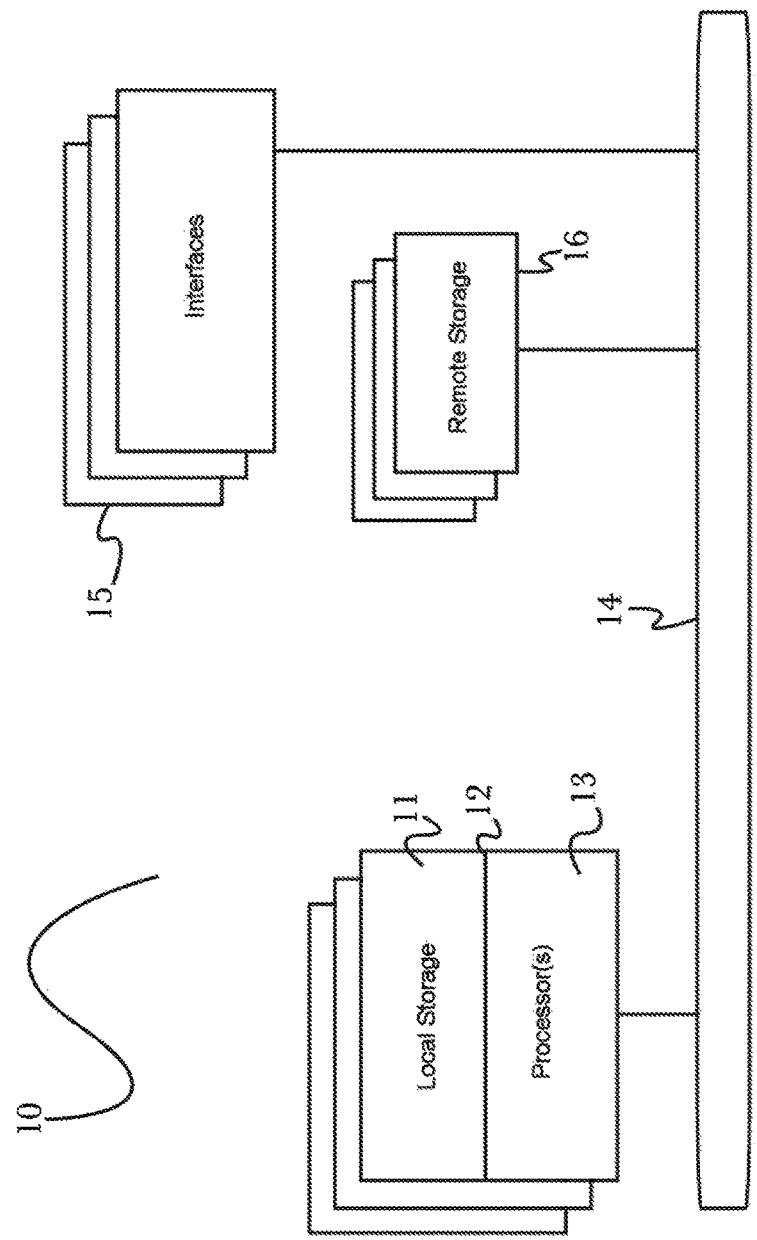
FIG. 3 is a block diagram showing an exemplary architectural arrangement of clients, servers, and external services, according to an embodiment of the invention.

Referring now to FIG. 3, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one embodiment, a computing device 10 may be configured or designed to function as a server system utilizing CPU 12, local memory 11 and/or remote memory 16, and interface(s) 15. In at least one embodiment, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a specific embodiment, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a Qualcomm SNAPDRAGON™ or Samsung EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 3 illustrates one specific architecture for a computing device 10 for implementing one or more of the inventions described herein, it is by no means the only device architecture on which at least a portion of the features and techniques described herein may be implemented. For example, architectures having one or any number of processors 13 may be used, and such processors 13 may be present in a single device or distributed among any number of devices. In one embodiment, a single processor 13 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 4:
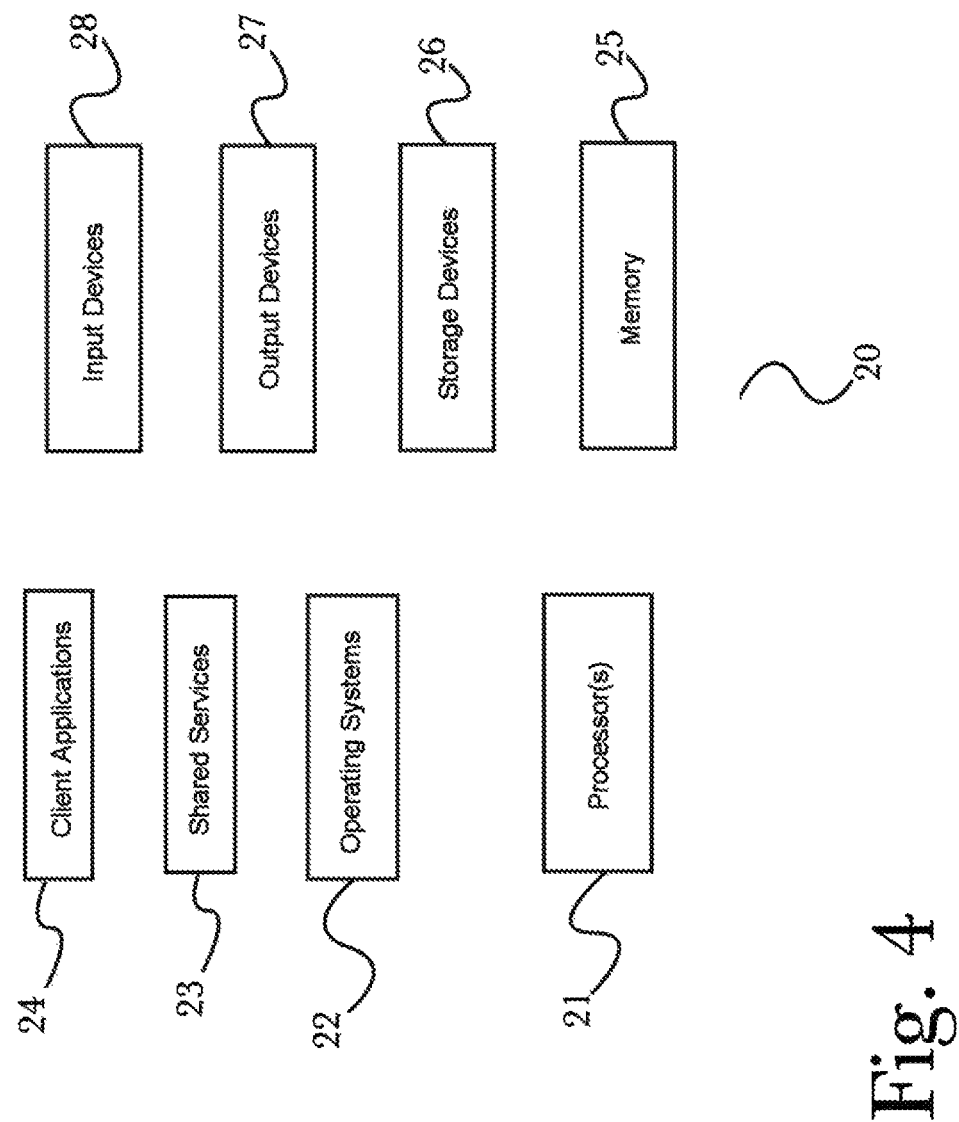
FIG. 4 is another block diagram illustrating an exemplary hardware architecture of a computing device used in various embodiments of the invention.

In some embodiments, systems according to the present invention may be implemented on a standalone computing system. Referring now to FIG. 4, there is shown a block diagram depicting a typical exemplary architecture of one or more embodiments or components thereof on a standalone computing system. Computing device 20 includes processors 21 that may run software that carry out one or more functions or applications of embodiments of the invention, such as for example a client application 24. Processors 21 may carry out computing instructions under control of an operating system 22 such as, for example, a version of Microsoft's WINDOWS™ operating system, Apple's Mac OS/X or iOS operating systems, some variety of the Linux operating system, Google's ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 3). Examples of storage devices 26 include flash memory, magnetic hard drive, CD-ROM, and/or the like.

Figure 5:
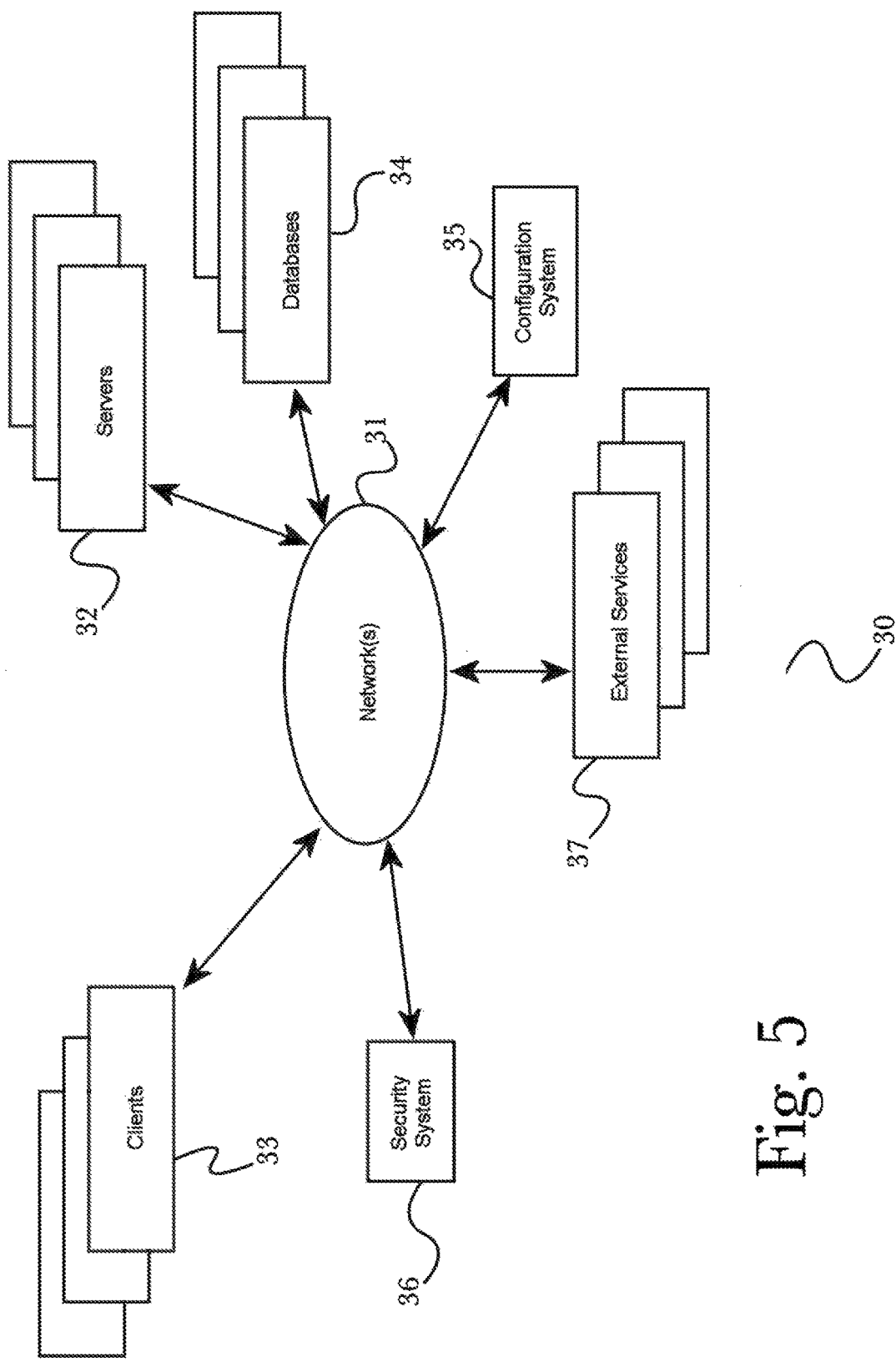
FIG. 5 is an illustration of an exemplary system architecture for business intelligence integration, according to a preferred embodiment of the invention.

In some embodiments, systems of the present invention may be implemented on a distributed computing network, such as one having any number of clients and/or servers. Referring now to FIG. 5, there is shown a block diagram depicting an exemplary architecture 30 for implementing at least a portion of a system according to an embodiment of the invention on a distributed computing network. According to the embodiment, any number of clients 33 may be provided. Each client 33 may run software for implementing client-side portions of the present invention; clients may comprise a system 20 such as that illustrated in FIG. 4. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as WiFi, Wimax, LTE, and so forth), or a local area network (or indeed any network topology known in the art; the invention does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in an embodiment where client applications 24 are implemented on a smartphone or other electronic device, client applications 24 may obtain information stored in a server system 32 in the cloud or on an external service 37 deployed on one or more of a particular enterprise's or user's premises.

In some embodiments of the invention, clients 33 or servers 32 (or both) may make use of one or more specialized services or appliances that may be deployed locally or remotely across one or more networks 31. For example, one or more databases 34 may be used or referred to by one or more embodiments of the invention. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, Hadoop Cassandra, Google BigTable, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 36 or configuration system 35 or approach is specifically required by the description of any specific embodiment.

Figure 6:
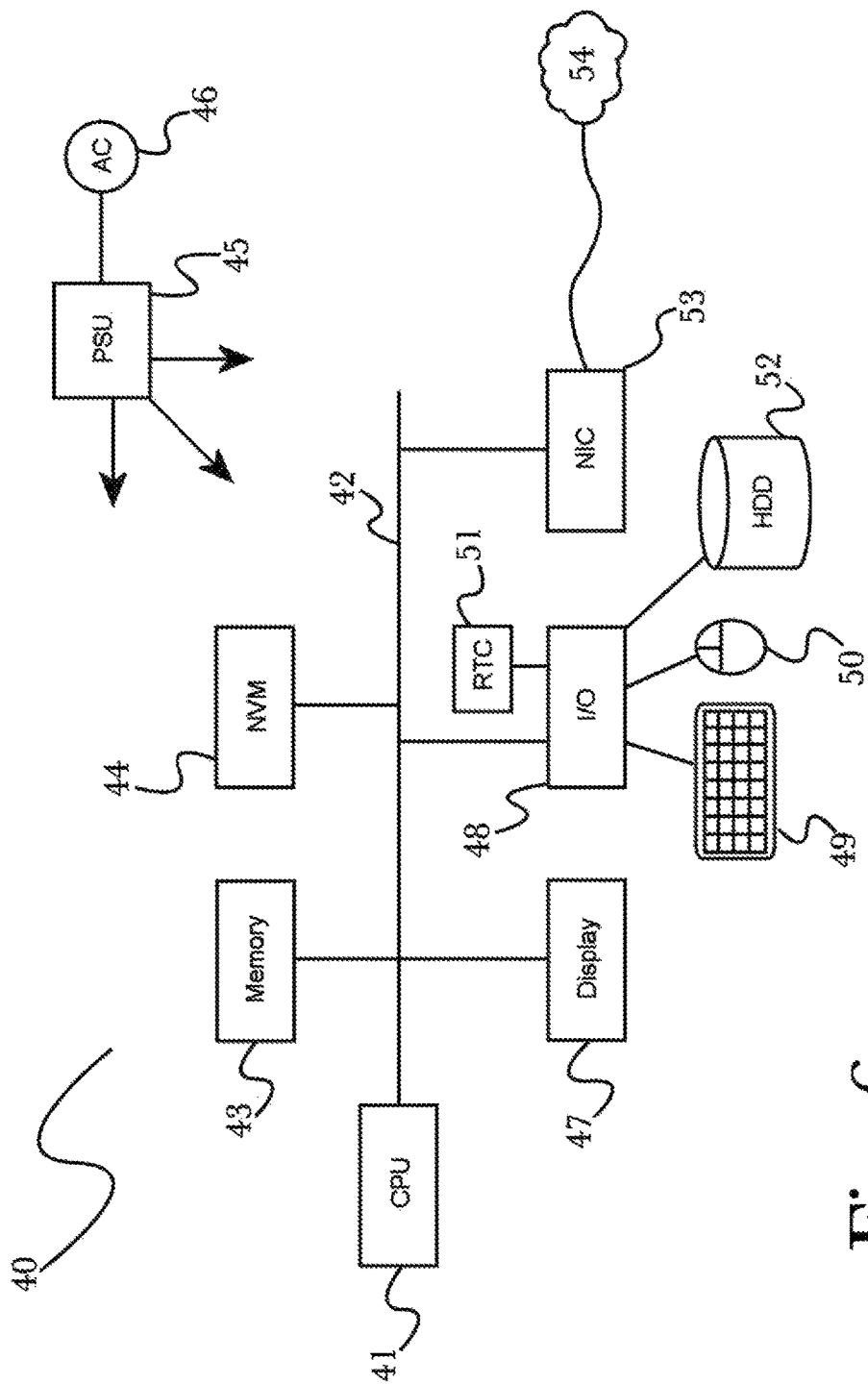
FIG. 6 is a flow diagram illustrating an exemplary method for business intelligence integration, illustrating a process for query translation and processing, according to a preferred embodiment of the invention.

FIG. 6 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of the present invention may be distributed among any number of client and/or server components. For example, various software modules may be implemented for performing various functions in connection with the present invention, and such modules may be variously implemented to run on server and/or client components.
Conceptual Architecture FIG. 1 is an illustration of an exemplary system architecture 100 for business intelligence integration, according to a preferred embodiment of the invention. According to the embodiment, a BI integration system 110 may connect to a plurality of BI data sources 101 (for example including, but not limited to, Oracle OBIEE™, COGNOS™, MICROSTRATEGY™, BUSINESS OBJECTS™, and others for example using a web application programming interface (API) 111 to facilitate two-way interaction and data integration with web-enabled products or services, and may also connect to a plurality of visualization platforms 102a-n operating on visualization devices such as server computers 102a or desktop workstations 102n (for example including, but not limited to, TABLEAU™, Microsoft POWERBI™, QLIKVIEW™, SPOTFIRE™, Microsoft EXCEL™, and others), for example using an appropriate API according to the software or hardware nature of a visualization platform. For example, a desktop API 112 may be used to connect to desktop or workstation-based visualization platform 102a, for example to take advantage of desktop-specific features such as (for example) live visualization presentation on a connected video display device as information is received or processed (for example, many desktop computing devices have an attached or integral display device, such as in a laptop computer or a desktop computer with a connected video display monitor). A server API 113 may be used to connect to a server-based visualization platform 102n, for example to take advantage of server-specific features such as particular CPU architectures or software arrangements that may improve data processing (for example, many server computing systems are designed with computationally-focused hardware in place of more "consumer-centric" devices that might be found in a desktop computer, and may lack a display device entirely). According to a preferred embodiment, system 100 may connect to a data presentation layer within a BI engine web service module 101, discover subject areas that a user has access to, and may then utilize a query transformation server 114 to perform two-way query-transformation operations to facilitate business intelligence engine web service integration, examples of which are described below.

A query transformation server 114 removes the visualization data column from the SQL query formulated by the client and transmits the query with the modified SQL query wrapped in an XML wrapper to a business intelligence (BI) engine web service module 101 The BI engine web service module may associate custom fields with object metadata in the database tables it maintains and send that information as part of the XML wrapped SQL response. The query transformation server 114 receives the response, unpacks the SQL in it, including the custom metadata fields included by the BI engine web service module 101, reattaches the visualization column and passes the data to the APIs of the BI integration system. These custom metadata fields may be used by a visualization platform for joining tables. For example:

Table A has ColA, ColB, ColC in BI engine web service module

Table B has ColD, ColE, ColF in BI engine web service module

Visualization platform cannot join Table A and Table B because there is no common column.

BI integration system adds a unique global identifier, that can act as a link, to Table A and Table B.

Now visualization platform can join Table A and Table B automatically and allow visualization of data.

When a visualization platform 102a-n sends a query (for data or for metadata), system 110 may remove any custom fields, translate the query as needed, and then provide the query to the appropriate connected BI engine web service module 101. Translation may comprise identifying keywords or phrases within a query, and for each identified keyword or phrase system 110 checks the particular query syntax for a BI engine web service module 101. If necessary, system 110 applies a plurality of transformations to some or all keywords or phrases, to translate them into appropriate syntax for use by BI engine web service module 101, and then transmits the translated query for handling. It will be appreciated that a wide variety of keywords, phrases, syntax parameters, and translation types may be possible according to a particular arrangement, and that the specific syntax and capabilities of different BI engine web service modules and visualization platforms may vary greatly according to the embodiment.

When a BI engine web service module 101 responds to a query, system 110 may then re-attach custom fields to the data prior to transmitting the response to a visualization platform. As a part of this translation process, the BI integration system 110 may transform the query itself as needed to produce a query suitable for a BI engine web service module 101.

Additionally, a single query may be "broken down" into smaller queries, such as to turn a single query that returns a large data set into a number of queries that each return a subset of that data, allowing queries to process more efficiently while remaining entirely transparent to a user. Generally, this may be accomplished by determining an appropriate maximum query length (for example, the maximum number of rows supported by a particular BI engine web service module 101 or the maximum that can be reasonably processed in an allotted time frame), and then iterating over the query and reading rows into a second query, stopping when the limit is reached. This process may be repeated beginning with the final row to "pick up where it left off" and prevent any rows from being skipped, to divide a single large query into multiple smaller queries without data loss, and each small query may then be provided to a BI engine web service module 101 for handling. This process may also be used for load-balancing, to distribute processing across multiple appropriate BI engine web service modules 101 when possible, to speed up handling for large data operations. In this manner, it can be appreciated that a two-way translation and integration is accomplished, where BI engine web service modules 101 and visualization platforms 102a-n operate natively and a BI integration system 110 handles all custom data and operations to facilitate this integration with complete transparency to a user.

BI integration may also be used for BI reports, presenting BI reports regardless of complexity as a simple table with columns. Reports with complex queries across multiple tables may be transformed into a virtual table (for example, utilizing SQL "nested query"), and applications may then query against the virtual table normally. Columns may be intelligently mapped using aliases, and a "smart filter" capability may be used to send the filter conditions provided by an application to the report filter. For getting a list of values for filters in the application, the column may be mapped to a specific table and query only that specific table and not the entire report, further optimizing the process.

DETAILED DESCRIPTION OF EXEMPLARY EMBODIMENTS

Figure 2:
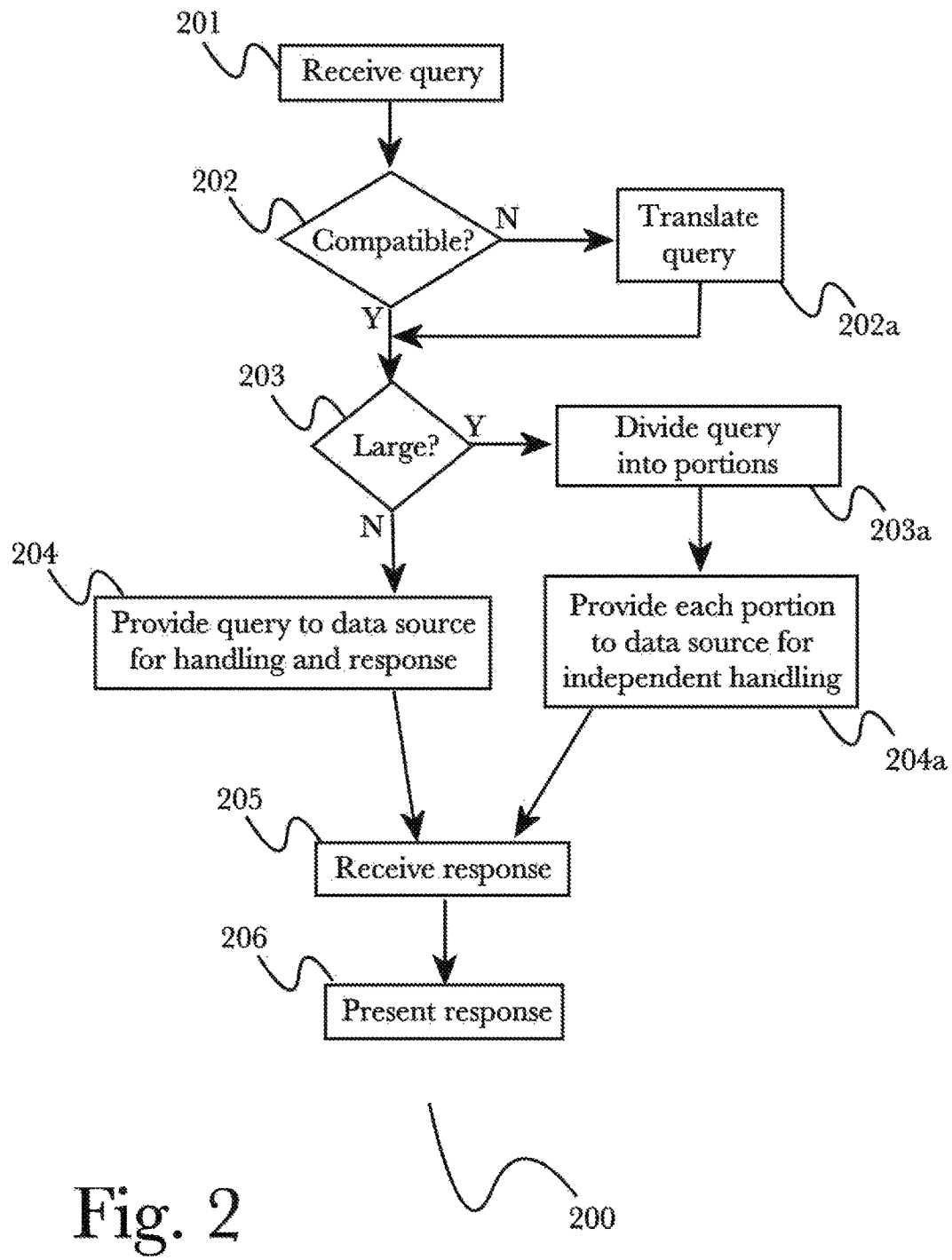
FIG. 2 is a block diagram illustrating an exemplary logical architecture for a client device, according to an embodiment of the invention.

FIG. 2 is a flow diagram illustrating an exemplary method 200 for business intelligence integration, illustrating a process for query translation and processing, according to a preferred embodiment of the invention. In an initial step 201, a BI integration system 110 may receive a query from a user device (such as, for example, a computer workstation or a server). In a next step 202, system 110 may check the query against a BI engine web service module 101 to determine if the query is in a structure or format that is natively compatible with the BI engine web service module 101, and if not the query may be translated in an optional processing step 202a. System 110 may then examine the query to determine if it is a "large query" in a next step 203, based on known configuration such as specific capabilities of a BI engine web service module (for example, a maximum query size or known statistics relating query size to speed of handling), and if the query is too large it may be segmented into equal, smaller portions in an optional processing step 203a. In a next step 204, the query may be transmitted to a BI engine web service module 101 for handling and response. If a query was segmented in a previous step 203a, the manageable portions may instead be provided to a BI engine web service module 101 for individual handling, rather than sending the entire query as a whole. In addition, this segmentation and independent handling method may be used for query load-balancing, dividing a query into portions and providing portions to different BI engine web service modules so they may be handled in parallel to expedite operation while distributing the workload. In a next step 205, a BI integration system 110 may receive a response from a BI engine web service module 101, and in a final step 206 may provide that response (or a portion thereof, and optionally with custom metadata attached as needed for a particular visualization system, as described previously with reference to FIG. 1) for further use or review.

FIG. 7 is a flow diagram illustrating an exemplary method 700 for business intelligence integration, illustrating a process for query translation and processing, by a query transformation server according to a preferred embodiment of the invention. In the initial step, 701, an SQL query for some data stored on a business intelligence engine webserver module as depicted in FIG. 1, 101 may be received by a query translation server depicted in FIG. 1, 114 which, in the embodiment, is a component of the business intelligence integration system shown in FIG. 1, 110, from a client device. Once within query transformation server, 740, the client device's SQL query is first inspected for the presence of a column of visualization-specific metadata 702, which, if present, is removed from the query 703 to be sent to business intelligence engine service module 101. The SQL query is further prepared for transmission within query transformation server through application of any further transformations needed for inter-system compatibility followed by embedding the SQL query within an XML-based query 704. XML query, either in-whole or divided into parts as described in FIG. 2 with the SQL query embedded in multiple XML-based query messages, is then sent to target business intelligence engine web service 730 for fulfillment 705. The query response, comprising an SQL-based response embedded in an XML-based response is issued by business intelligence engine service 730 and received within query transformation server 706 where SQL-based query response is extracted from the XML-based parent, compatibility transformations, if any, are carried out, the visualization-specific metadata column may be re-added 709, 710 to the SQL query response, dependent on the requirements of the client visualization system, and the query response is delivered to requesting client device 711 for direct review or further processing dependent of the purpose of the query process.

The skilled person will be aware of a range of possible modifications of the various embodiments described above. Accordingly, the present invention is defined by the claims and their equivalents.

What is claimed is:

1. A system for business intelligence data integration, comprising:
   a query transformation server comprising at least a plurality of programming instructions stored in a memory and operating on a processor of a network-connected computing device and configured to:
      connect to a plurality of business intelligence engine web services via a network;
      receive a SQL query from a client device;
      apply a plurality of transformations to the SQL query including at least removal of a visualization-specific column from the SQL query and embedding the SQL query into an XML web services request;
      provide at least a portion of the XML web services request to a business intelligence engine web service;
      receive an XML response from the business intelligence engine web service;
      apply a plurality of modifications to at least a portion of the XML response including extracting SQL from the XML and adding back the visualization-specific column to generate a complete SQL response; and
      provide the SQL response to the client device; and
   a plurality of communication adapters configured to facilitate bi-directional communication between query transformation server and other systems via a network.

2. The system of claim 1, wherein the network-connected client device comprises at least a business intelligence data visualization system.

3. The system of claim 1, wherein the plurality of transformations comprises at least dividing the query into portions.

4. The system of claim 1, wherein the plurality of transformations comprises at least modifying the structure of at least a portion of the query for data compatibility with a particular business intelligence engine web service.

5. The system of claim 1, wherein the plurality of modifications comprises at least associating a plurality of custom metadata values to the response.

6. The system of claim 5, wherein the plurality of custom metadata values comprises at least a plurality of values that direct the operation of a business intelligence data visualization system.

7. A method for business intelligence data integration, comprising the steps of:
   (a) receiving an SQL query from a client device at a query transformation server comprising at least a plurality of programming instructions stored in a memory and operating on a processor of a network-connected computing device and configured to connect to a plurality of business intelligence engine web services via a network;
   (b) applying a plurality of transformations to the SQL query including at least removal of a visualization-specific column from the SQL query; embedding the SQL query into an XML web services request using the query transformation server;
   (c) providing at least a portion of the XML web services request to a business intelligence engine web service;
   (d) receiving an XML response from the business intelligence engine web service to the query transformation server;
   (e) applying a plurality of modifications to at least a portion of the XML response including extracting SQL from the XML and reattaching the visualization-specific column to generate a complete SQL response using the query transformation server and providing the SQL response to the client device;
   (f) applying a plurality of transformations to at least a portion of the query;
   (g) transmitting at least a portion of the transformed query to a business intelligence engine web service;
   (h) receiving a response from the business intelligence engine; and
   (i) providing at least a portion of the response to the client device.

8. The method of claim 7, wherein the plurality of transformations comprises at least modifying the structure of at least a portion of the query for data compatibility with a particular business intelligence engine web service.

9. The method of claim 7, wherein the plurality of transformations comprises at least dividing the query into portions.

10. The method of claim 7, further comprising the step of applying a plurality of modifications to the response.

11. The method of claim 10, wherein the plurality of modifications comprises at least associating a plurality of custom metadata with at least a portion of the response.

* * * * *